(12) United States Patent
Zuehlke et al.

(10) Patent No.: US 8,110,777 B2
(45) Date of Patent: Feb. 7, 2012

(54) METHOD AND DEVICE FOR DIVIDING A PLANE-PARALLEL PLATE MADE OF A BRITTLE MATERIAL INTO A PLURALITY OF INDIVIDUAL PLATES BY MEANS OF A LASER

(75) Inventors: Hans-Ulrich Zuehlke, Jena (DE); Patrick Mende, Gera (DE); Gabriele Eberhardt, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 862 days.

(21) Appl. No.: 12/218,020

(22) Filed: Jul. 9, 2008

(65) Prior Publication Data
US 2009/0014425 A1 Jan. 15, 2009

(30) Foreign Application Priority Data
Jul. 12, 2007 (DE) .......................... 10 2007 033 242

(51) Int. Cl.
*B23K 26/40* (2006.01)
*H01L 21/301* (2006.01)
*C03B 32/02* (2006.01)
*B26F 3/16* (2006.01)

(52) U.S. Cl. ............... 219/121.68; 219/121.69; 438/463; 225/2; 269/21; 29/743; 83/879; 83/880

(58) Field of Classification Search ........... 219/121.67–121.69, 121.72, 121.82, 219/121.84; 438/463; 148/DIG. 28; 225/2; 65/97, 174; 269/21; 29/743; 83/879, 880
See application file for complete search history.

(56) References Cited

U.S. PATENT DOCUMENTS

| | | | |
|---|---|---|---|
| 3,448,510 A * | 6/1969 | Johnson, Jr. et al. | 29/413 |
| 6,211,488 B1 * | 4/2001 | Hoekstra et al. | 219/121.72 |
| 7,128,869 B2 * | 10/2006 | Habisreitinger et al. | 264/510 |
| 7,592,237 B2 * | 9/2009 | Sakamoto et al. | 438/462 |
| 7,656,012 B2 * | 2/2010 | Doan | 257/668 |

FOREIGN PATENT DOCUMENTS
JP 11245163 A * 9/1999
* cited by examiner

*Primary Examiner* — Samuel M Heinrich
(74) *Attorney, Agent, or Firm* — Duane Morris LLP

(57) ABSTRACT

The present invention relates to a method of dividing a plane-parallel plate made of a brittle material into a plurality of individual plates having a specified edge length, in which break-off cuts are made along specified scored lines that form a lattice-like pattern by introducing thermally induced stresses by means of a laser beam, and in which, after making the break-off cuts along a first working direction, the resultant plate strips are spaced out at intervals in that a framed stretch film to which the plane-parallel plate is bonded is stretched by means of a vacuum device. The invention also relates to a device with a special clamping table for use in carrying out the method.

8 Claims, 2 Drawing Sheets

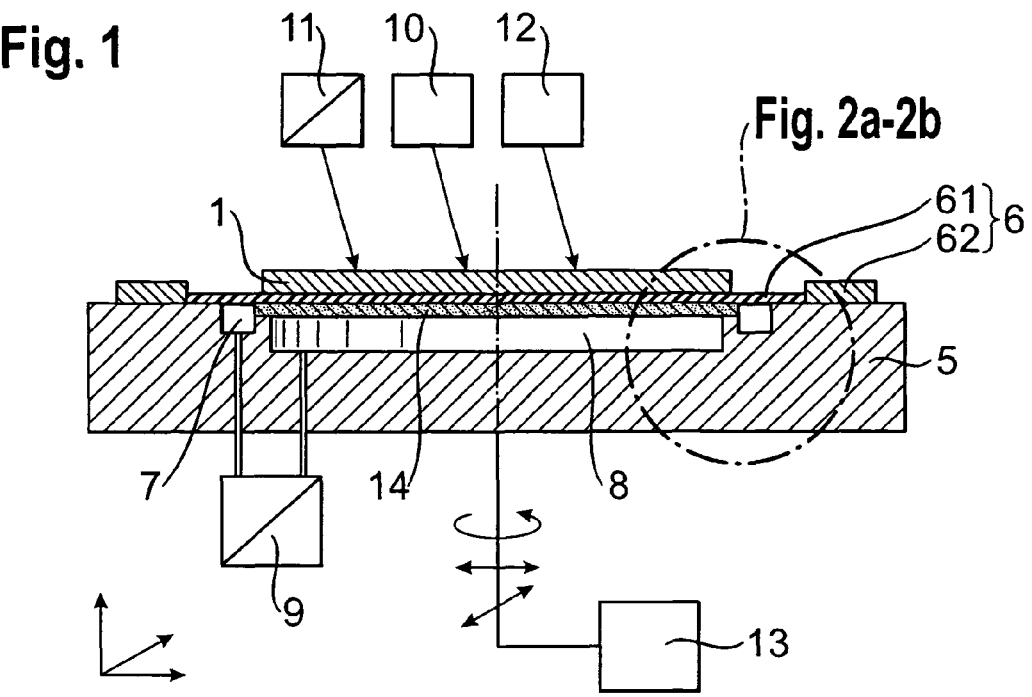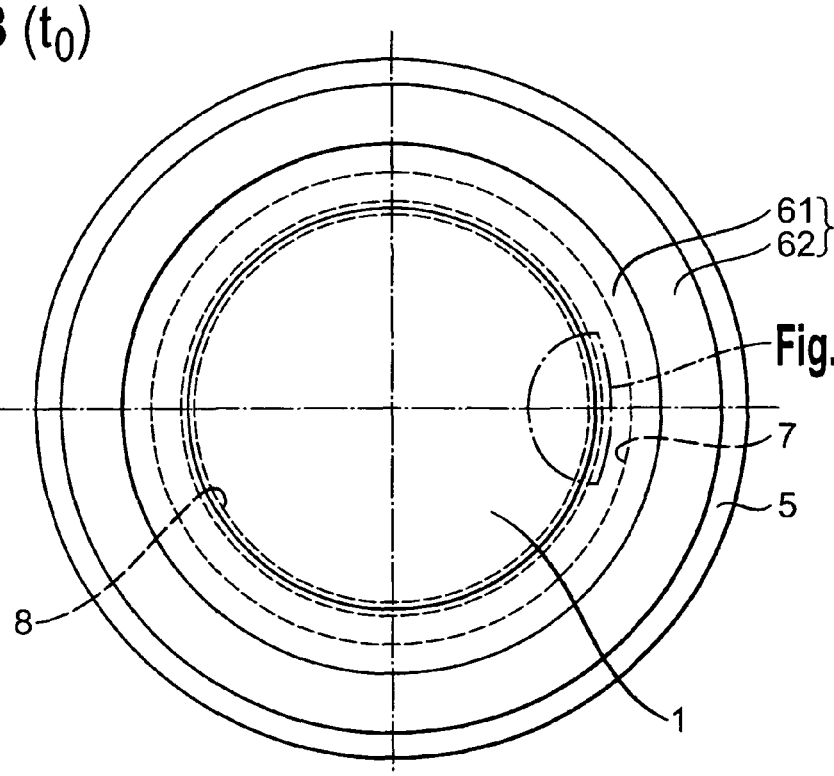

Fig. 2a ($t_1$)
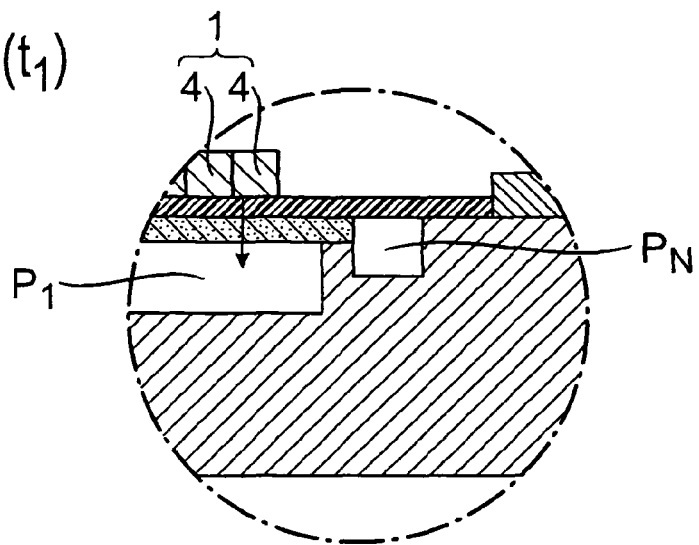
Fig. 2b ($t_2$)
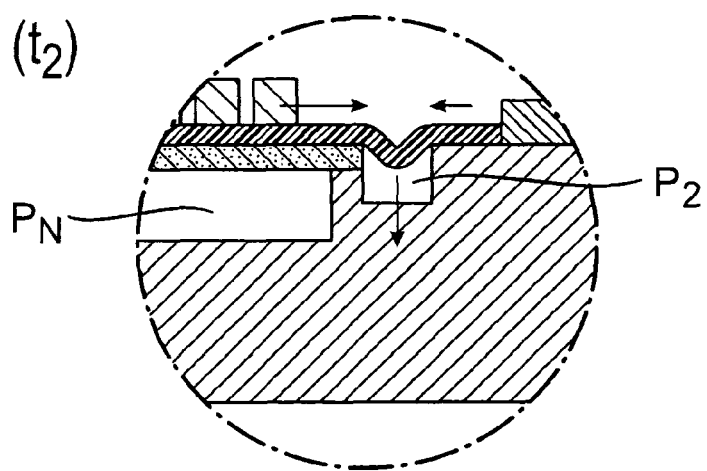
Fig. 4a ($t_1$)
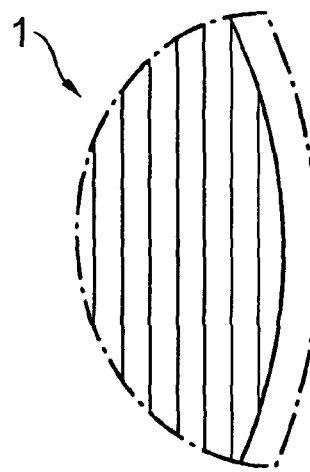
Fig. 4b ($t_2$)
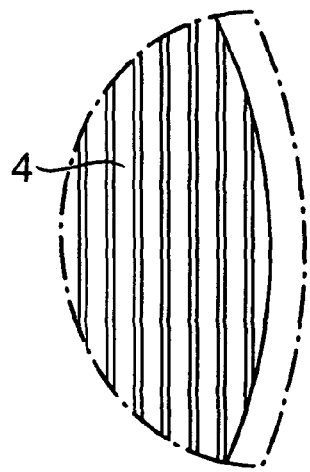
Fig. 4c ($t_3$)
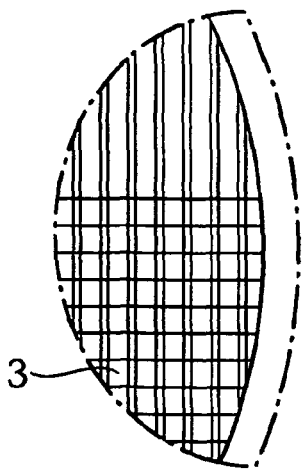

METHOD AND DEVICE FOR DIVIDING A PLANE-PARALLEL PLATE MADE OF A BRITTLE MATERIAL INTO A PLURALITY OF INDIVIDUAL PLATES BY MEANS OF A LASER

FIELD OF THE INVENTION

The subject matter of the present invention relates to a method, by means of which a plane-parallel plate made of a brittle material, such as glass, ceramic, or monocrystalline materials, such as silicon, sapphire or gallium arsenide, is divided into a plurality of individual plates by introducing thermally induced stresses by means of a laser beam and a device suitable for this purpose. A generic method and a generic device are known from the German Patent Specification DE 100 41 519 C1.

BACKGROUND OF THE INVENTION

It is known that brittle materials can be divided by introducing thermally induced stresses by means of a laser beam. To this end, a laser beam is directed onto the surface of the material, along the desired scored line (working line), so as to produce compressive stresses, and subsequently, a coolant jet is applied to the heated zone, which produces tensile stresses.

If the resultant stress difference is greater than the ultimate stress of the material and there is a defect in the working line, a tear in the material is initiated, starting from the defect.

If such a defect is not available because there are no existing microcracks, e.g., originating from a mechanical cutting edge, an initial defect must be targetedly produced, e.g., by means of a diamond cutting wheel or an accurately focusable laser with high energy density. As to the latter, the working laser or a second laser can be used.

Depending on the internal structure of the material, it is possible to make a targeted deep cut or a break-off cut that completely penetrates the material.

To divide a plane-parallel plate into a plurality of identical individual rectangular plates, e.g., in the production of display panels for mobile telephones or the like or in the production of chips, the plane-parallel plate is initially divided along a plurality of first working lines that run parallel to one another and subsequently, perpendicular thereto at an angle of intersection of 90°, the plane-parallel plate is divided along a plurality of second cutting lines that run parallel to one another. Determined by the points of intersections of the working lines that intersect at an angle of 90°, this leads to individual rectangular plates, the side lengths of which are determined by the distances between the working lines.

The method is not limited to dividing plane-parallel plates into individual rectangular plates but to dividing them in a lattice-like pattern, with the rectangular shape being useful for the applications mentioned above.

The German Patent Specification DE 100 41 519 C1 acknowledges the problem that this type of method entails, which is that it is difficult to produce the initial defects at the points of intersection. According to this document, dividing a plane-parallel plate, beginning at an edge of the plane-parallel plate along a first working direction, into a plurality of plate strips is not a problem since, in order to produce the initial defect required for each scored line, it is possible to apply a cutting wheel with high accuracy to the edge of the plane-parallel plate.

In contrast, to create the initial defects along the resultant edges of the plate strips—or more accurately, at the points of intersections—the cutting wheel must be applied from above in order to divide the adjoining plate strips into individual plates. According to this document, due to the method used, this would result in damage to the converging edges of the individual plates.

The German Patent Specification DE 100 41 519 C1 proposes that the plate strips cut from a plane-parallel glass plate be moved by a specified distance apart from one another before dividing them into individual plates. This makes it possible for the cutting wheel to be accurately applied to the edges of the plate strips as well.

To this end, the plane-parallel glass plate is mounted on a cutting table which comprises several plate segments that can be moved apart from one another. The cutting table preferably has a dedicated vacuum system for clamping the plane-parallel glass plate and the cut parts. Special advantages are promised if each table segment has a dedicated, separately controllable vacuum field. This, it is said, makes it possible to mount and detach the cut plate strips separately, thereby avoiding a negative influence of the glass, which may potentially have become warped because of the vacuum, on the subsequent laser cutting procedure.

Apart from the high degree of mechanical complexity, in combination with a cutting table of the type described in this document, a device with such a cutting table has the crucial disadvantage that the width of the plate strips cannot be freely chosen, but that this width is instead defined by the width of the separate table segments. Thus, the choosable width of the plate strips is predetermined by the width of a table segment or a multiple of the width of a table segment.

In addition, the thickness of the plane-parallel glass plates is limited to the minimum thickness of the plane-parallel glass plates that are generally directly mounted on the cutting table.

Plane-parallel plates in a thickness range from 100-300 µm, such as are produced in the form of thin wafers from silicon or gallium arsenide, are generally only bonded to stretch films. After completion of processing and separating the chips, the stretch film is stretched in order to avoid mechanical damage to the chip edges during transport, on the one hand, and to be able to detach the chips one by one from the film, without allowing them to come into contact with the adjacent chips, on the other hand.

According to current practice, the chips are primarily separated by mechanically sawing them apart. The German Patent Application DE 10 2005 012 144 A1 describes a device, by means of which scored lines, which are arranged in a lattice-like pattern, are applied to a wafer that is mounted on a film, using a laser beam which ablates material. However, the ablation of material invariably entails the risk that the surface will be contaminated.

The applicant of the present invention carried out tests in which an attempt was made to divide a wafer mounted on a film in a lattice-like pattern by introducing thermally induced stresses by means of a laser beam, as already briefly described in the introduction.

This led to quality defects at the points of intersection between the working lines along the first working direction and the working lines along the second working direction. However, these defects are not attributable to the fact that the tool, e.g., a laser or a diamond cutting wheel, was applied from above to the surface of the plane-parallel plate at the point of intersection, such as described in the prior-art German Patent Specification DE 100 41 519 C1, but are instead attributable to the fact that the resultant stresses in the adjacent strip plates reciprocally influence one another.

In the area of transition to the next plate strips, the hot spot that precedes the coolant spot produced causes the material to expand, which causes the hot spot to push against the previous plate strips, thereby causing the scored line on the end of the plate strips to be deflected from its intended direction of separation. Accordingly, given a specified point of intersection of two scored lines that intersect at an angle of 90°, no precise right angle forms along the edges of the individual plates.

The Japanese Patent JP 10-268275 A describes a method of cutting glass substrates and a device suitable for this purpose. The glass substrate to be cut is mounted on a holding fixture by attaching it by suction over a porous stretchable body. By stretching the body, the cutting properties are improved since during the cutting operation, tensile stresses are generated on the surface of the glass substrate.

This method is not suitable for spatially separating cut substrate segments.

SUMMARY OF THE INVENTION

The problem to be solved by the present invention is to make available a method suitable for dividing plane-parallel plates made of a brittle material and with a material thickness lower than 1 mm, in particular plane-parallel plates with a material thickness of 100-300 μm, into individual plates by introducing thermally induced stresses by means of a laser beam. It should also be possible to use this method for dividing a film-supported wafer into a plurality of chips.

In addition, the problem to be solved by the present invention is to create a device, by means of which a method according to the present invention can be implemented and which moreover makes it possible to divide plane-parallel plates into rectangular chips of freely choosable dimensions.

This problem is solved by a method with the features of Claim 1 and by a device with the features of Claim 5. Useful further developments are described in the dependent claims.

BRIEF DESCRIPTION OF THE DRAWINGS

The device and the method will be explained in greater detail by way of an example with reference to the annexed drawings, in which:

FIG. 1 shows a diagrammatic sketch of a device,

FIG. 2a shows a detail sketch of FIG. 1 at time $t_1$,

FIG. 2b shows a detail sketch of FIG. 1 at time $t_2$,

FIG. 3 shows a top view of a clamping table with a mounted plane-parallel plate on framed stretch film at time to, FIG. 4a shows a detail sketch of the top view of the plane-parallel plate at time $t_1$, FIG. 4b shows a detail sketch of a top view of the plane-parallel plate at time $t_2$, and FIG. 4c shows a detail sketch of a top view of the plane-parallel plate at time $t_3$.

DESCRIPTION OF AN EMBODIMENT OF THE INVENTION

The useful embodiment of a device shown in FIG. 1 and FIG. 3 substantially comprises a clamping table 5, on which the workpiece, i.e., a framed stretch film 6 with a plane-parallel plate 1 bonded to it, is mounted, and tools, i.e., a device 12 for creating initial defects, a device 10 for applying a laser beam, a device 11 for applying a coolant jet and means 13 for moving the devices 10, 11, 12 serving as tools relative to the plane-parallel plate 1 that constitutes the workpiece.

The relative movement must include at least one linear movement into one direction and a rotary movement about an axis perpendicular thereto or a linear movement into two directions within a plane enclosing a working angle.

Like the device known from the German Patent Specification DE 100 41 519 C1, the plane-parallel plate 1 is mounted on the clamping table 5 by means of a controllable vacuum field. Such a vacuum field is produced by a vacuum chamber 8 which, in the bearing plane of the clamping table 5, is sealed with a porous liner 14 and which is connected to a vacuum pump 9. The mounted framed stretch film 6 and, thus, the plane-parallel plate 1 bonded to the film are brought into contact with the porous liner 14 by means of suction and, thus, are friction-locked to the liner.

In the context of this description, vacuum is defined as a pressure which is markedly lower than the atmospheric pressure under normal conditions, i.e., lower than normal pressure $P_N$, and which is sufficient for this function. That is, in the context of this description, an underpressure applied to this first vacuum field will be called vacuum $P_1$ if it is high enough to securely hold the mounted plane-parallel plate 1 while the plate is being processed.

The vacuum chamber 8 is preferably sealed with a porous liner 14, e.g., made of a ceramic material, the circumference of which is smaller or equal to the mounted plane-parallel plate 1. This ensures that potential damage to the porous liner 14 by the laser beam as it sweeps across the edge of the flat plat is avoided. Thus, the porous liner 14 for a circular plane-parallel plate should therefore be a circular disk.

The surface of the clamping table 5 between the porous liner 14 and the groove 7 is preferably highly reflective for the laser beam to ensure that the laser beam does not cause damage to the clamping table as it sweeps across the edge of the plane-parallel plate. The framed stretch film 6 is made of a material transparent to the laser beam.

Instead of using a single porous liner 14 to seal the vacuum chamber 8 with respect to the bearing surface of the clamping table 5, the vacuum chamber 8 can, in principle, also be sealed by means of a gas-tight plate into which a plurality of porous liners 14 are fitted. In this case, the framed stretch film 6 is attached only to certain points of the surface, which appears to be less of an advantage.

The fact that, in contrast to the prior art, the plane-parallel plate 1 does not rest directly on the clamping table 5 but instead indirectly by way of a framed stretch film 6 makes hardly any difference as far as the retention of the initially unworked plane-parallel plate 1 is concerned.

The devices serving as the tools mentioned earlier and the means 13 for implementing the relative movement are also included and designed as in the prior art. The relative movement makes it possible to introduce thermal stresses and, thus, to create break-off cuts along specified scored lines that form a lattice-like pattern.

After dividing the plane-parallel plate 1 into individual plate strips 4 by producing break-off cuts along a first working direction, these plate strips 4 are divided into individual plates 3 by introducing break-off cuts along a second working direction, which forms a working angle with the first working direction. This working angle is preferably a right angle but a different angle can be formed as well, in which case individual plates in the shape of parallelograms would be obtained. However, their practical usefulness is limited to special cases and therefore, the following description will focus on a right angle as the working angle and, consequently, on individual rectangular plates, which is more relevant to practical applications.

Before the break-off cuts along the second working direction are made, the plate strips 4, the separating edges of which are still in contact with one another, are separated from one another. At this point, the device described as well as the method differ markedly from the prior art.

In addition of a first vacuum field which is produced as described above and which serves solely to hold the plane-parallel plate 1 while the break-off cuts are being made, the device also comprises a second controllable vacuum field formed by a groove 7, which encloses the first vacuum field. If the first vacuum field is circular, groove 7 will form a circular ring.

The mode of functioning of the two vacuum fields will be explained in greater detail based on FIGS. 2a and 2b.

As vacuum $P_1$ is removed from the first vacuum field and vacuum $P_2$ is applied to groove 7, the framed stretch film 6 covering said groove is sucked into and pulled into the groove 7. By mounting the stretch film 61 in a frame 62, which defines the framed stretch film 6, the stretch film 61 is stretched across its entire area within the frame 62, with the maximum stretch being reached directly above the groove 7. The plate strips 4 bonded to framed stretch film 6 are pulled apart so that they are spaced at a certain distance from one another. While the stretch film 61 is in the stretched state, vacuum $P_1$ is again applied to the first vacuum field, and vacuum $P_2$ in groove 7 is subsequently removed. In this manner, the plate strips 4, spaced at the distance from one another that had previously been created between them, are again held in place.

Vacuum $P_2$ in groove 7 should also be understood as an underpressure that is sufficient to stretch the framed stretch film 6 as a function of its material properties sufficiently to ensure that a spacing between the plate strips 4 is created, which spacing makes it impossible for the plate strips 4 to be influenced as they are separated along the second working direction.

To apply a vacuum to groove 7, the groove is also connected to a vacuum pump 9. This vacuum pump 9 is preferably the already available vacuum pump 9 for generating the first vacuum field, which pump subsequently alternately generates a vacuum in the vacuum chamber 8 and in groove 7.

Assuming that, as is generally the case, a circular plane-parallel plate is used, it should be noted when dimensioning a device that the frame 62 has an inside diameter that is larger than the outside diameter of groove 7. The framed stretch film 6 is then radially stretched toward its center. Ideally, the plane-parallel plate 1 is mounted in such a manner that its center coincides with the center of the framed stretch film 6. To obtain a reproducible maximum stretch, not only the vacuum level and thus the tensile strength but also a reproducible surface measure, on which the vacuum acts, are determining factors, which is why the frame should come to rest outside the groove 7 on the clamping table 5.

The shape of the groove is of lesser importance; however, the width and the depth of the groove can have an influence on the possible stretch. The wider the groove, the larger will be the area on which the vacuum can act. An excessively shallow groove could limit the quantity of material that can be pulled into groove 7. Preferably, the inside edge of groove 7 is rounded off, and the surface of the porous liner 14 is as nonadhesive as possible to ensure that the static friction which counteracts the stretch is as low as possible.

To carry out the method, the plane-parallel plate 1, e.g., a circular silicon wafer with a diameter of 6"-12", is mounted on a framed stretch film 6 unless it is already mounted on such a film. As explained earlier, wafers are generally worked, stored and transported while already mounted on such stretch films.

The framed stretch film 6 with the silicon wafer is placed on the clamping table 5 so that the wafer is positioned in the center of the porous liner 14 of the first vacuum field. Vacuum $P_1$ is applied to the first vacuum field, i.e., an underpressure high enough to securely hold the framed stretch film 6 and thus the wafer during subsequent processing. Depending on the specified number of scored lines, e.g., at a distance of 0.5-30 mm from one another, one initial defect each is created along a first working direction and, starting from the initial defect, subsequently break-off cuts are made.

The person skilled in the art knows how to create initial defects, e.g., using a diamond wheel or a laser beam, and how to make the break-off cuts along the scored lines by means of a laser beam and a subsequent coolant jet, and therefore no further explanation is required.

Essential to the invention is the creation of a space between the cut plate strips 4 to prevent a mutual interaction when the plate strips 4 are separated to produce individual plates 3. A space interval of 3-10 μm is sufficient.

The creation of the initial defects, which in the second working direction does not only take place along an edge of the plane-parallel plates but also along the edge of the plate strips, can take place before or after the spacing step. For wafers in a thickness range from 100-300 μm, it is recommended that the initial defect be created prior to this step. That is, first all initial defects are created for the break-off cuts along the second working direction before a space is created between the plate strips 4.

After the spacing step, the break-off cuts along the second working direction, each starting from an initial defect, are made at intervals spaced 0.5-30 mm apart. The individual plates 3 are preferably produced so as to be square, i.e., at a working angle of 90°.

In FIGS. 4a-4b, a detail sketch of a wafer is shown at various stages of the dividing process.

At time $t_1$ (FIG. 4a), the wafer is divided along the first working direction, with the resultant plate strips 4 still being in contact with one another.

At time $t_2$ (FIG. 4b), the plate strips 4 have already been spaced apart, and at time $t_3$ (FIG. 4c), the strips 4 have already been divided into individual plates 3 across part of their length.

LIST OF REFERENCE NUMERALS

1 Plane-parallel plate
2 Scored line,
3 Individual plate,
4 Plate strip,
5 Clamping table,
6 Framed stretch film,
61 Stretch film,
62 Frame,
7 Groove,
8 Vacuum chamber,
9 Vacuum pump,
10 Device for applying a laser beam,
11 Device for applying a coolant jet,
12 Device for creating initial defects,
13 Means for producing relative movements,
14 Porous liner,
$P_N$ Normal pressure,
$P_1$ Vacuum for holding the stretch film 61 by means of the first vacuum field,
$P_2$ Vacuum for stretching the stretch film 61 by means of the second vacuum field.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method of dividing a plane-parallel plate made of a brittle material into a plurality of individual plates having a specified edge length comprising:
   introducing thermally induced stresses by means of a laser beam in said plane-parallel plate thereby producing scored lines in a lattice-like pattern in said plane-parallel plate,
   said lattice-like pattern being formed by first producing scored lines along a first working direction starting from an initial defect to be created in the material of said plane-parallel plate thereby dividing said plane-parallel plate into a plurality of plate strips (4), and by subsequently producing scored lines along a second working direction which forms a working angle with said first working direction after said plate strips have been moved a certain distance apart from one another, thereby allowing division of said individual plate strips into individual plates,
   wherein said plane-parallel plate or said plate strips and individual plates are held on a clamping table by means of a vacuum, and wherein said plane-parallel plate is bonded to a framed stretch film, said framed stretch film being stretched at least in a direction perpendicular to the first working direction while said vacuum holding said plane-parallel plate is removed in order to create space intervals between said plate strips.

2. The method as in claim 1, wherein said initial defects for the scored lines along said second working direction are created prior to stretching the framed stretch film.

3. The method as in claim 1, wherein said framed stretch film is stretched radially, starting from the center of the bonded plane-parallel plate.

4. The method as in claim 3, wherein said stretching is implemented by applying a vacuum along a groove that encloses the plane-parallel plate.

5. A device for separating a plane-parallel plate made of a brittle material and bonded to a framed stretch film comprising:
   a device for applying a laser beam along specified scored lines on said plane-parallel plate,
   a device for applying a coolant jet along said scored lines on said plane-parallel plate,
   a device for creating initial defects on each starting point for a scored line,
   a clamping table with a first controllable vacuum field for mounting and holding said plane-parallel plate, and
   means for moving said devices relative to said clamping table along scored lines that form a lattice-like pattern,
   wherein said clamping table including a second separately controllable vacuum field that is formed by a groove designed to enclose said plane-parallel plate mounted on the clamping table and into which said framed stretch film is pulled in order to stretch it.

6. The device as in claim 5, wherein an inside edge of said groove is rounded off.

7. The device as in claim 5, wherein the mounting surface of said first vacuum field is a porous liner.

8. The device as in claim 5, wherein said mounting surface has a static friction that is as low as possible.

* * * * *